US006996161B1

(12) United States Patent
O'Farrell et al.

(10) Patent No.: US 6,996,161 B1
(45) Date of Patent: Feb. 7, 2006

(54) DATA COMMUNICATION IN A WIRELESS LOCAL AREA NETWORK USING M-ARY CODE KEYING

(75) Inventors: Timothy O'Farrell, Leeds (GB); Ahmed Al-Dabbagh, Leeds (GB)

(73) Assignee: Supergold Communication Limited, Limassol (CY)

( * ) Notice: Subject to any disclaimer, the term of this patent is extended or adjusted under 35 U.S.C. 154(b) by 0 days.

(21) Appl. No.: 10/009,657

(22) PCT Filed: Apr. 27, 2000

(86) PCT No.: PCT/IB00/00536

§ 371 (c)(1),
(2), (4) Date: Mar. 11, 2002

(87) PCT Pub. No.: WO00/67388

PCT Pub. Date: Nov. 9, 2000

(30) Foreign Application Priority Data

Apr. 30, 1999 (IE) .................................... S990361

(51) Int. Cl.
*H04B 1/69* (2006.01)
*H04J 3/06* (2006.01)
(52) U.S. Cl. ..................... 375/149; 375/148; 375/150; 370/510
(58) Field of Classification Search ............... 375/148, 375/149, 150, 130, 140; 708/250, 254
See application file for complete search history.

(56) References Cited

U.S. PATENT DOCUMENTS

| 5,696,789 | A | * | 12/1997 | Jones et al. | .................. | 375/130 |
| 5,781,583 | A | * | 7/1998 | Bruckert et al. | ............ | 375/146 |
| 5,818,887 | A | * | 10/1998 | Sexton et al. | ............... | 375/355 |
| 6,181,729 | B1 | | 1/2001 | O'Farrell | | |
| 6,366,600 | B1 | * | 4/2002 | Agrawal et al. | ............ | 375/130 |

FOREIGN PATENT DOCUMENTS

WO    WO 99/33212    7/1999

OTHER PUBLICATIONS

Andren, C., "A 2.4 GHz 11 MBps Baseband Processor for 802.11 Applications", Harris Semiconductor, May 5, 1998.
Kozaki, T., et al., "A 156-Mb/s Interface CMOS LSI for ATM Switching Systems", IEICE Transactions on Communications, Jun. 1, 1993, pp. 684-693.

* cited by examiner

*Primary Examiner*—Jay K. Patel
*Assistant Examiner*—Qutub Ghulamali
(74) *Attorney, Agent, or Firm*—Lipsitz & McAllister, LLC

(57) ABSTRACT

A method and apparatus for data communication using signature sequences and spread spectrum techniques to reduce the effects of certain transmission impairments in a Wireless local area network (WLAN). The invention uses a number of correlators and M-ary Code Keying with a Supergold signature sequence for simultaneously generating a periodic signal for acquiring symbol synchronization, a difference squarewave signal for acquiring and maintaining chip synchronization and a sum signal for determining received signal strength and setting threshold levels.

22 Claims, 11 Drawing Sheets

Figure 1

| Symbol Number | Symbol |
|---|---|
| $S_0$  | + + + - + + - + + - + + - - |
| $S_1$  | + + + + - - - - + + + + - - - - |
| $S_2$  | + + - - - - + + + + - - - - + + |
| $S_3$  | + + - - + + - - - - + + - - + + |
| $S_4$  | + - + - + - + - + - + - + - + - |
| $S_5$  | + - + - - + - + + - + - - + - + |
| $S_6$  | + - - + - + + - + - - + - + + - |
| $S_7$  | + - - + + - - + + - - + + - - + |
| $S_8$  | + + + + + + + + - - - - - - - - |
| $S_9$  | + + + + - - - - - - - - + + + + |
| $S_{10}$ | + + - - - - + + - - + + + + - - |
| $S_{11}$ | + + - - + + - - + + - - + + - - |
| $S_{12}$ | + - + - + - + - - + - + - + - + |
| $S_{13}$ | + - + - - + - + - + - + + - + - |
| $S_{14}$ | + - - + - + + - - + + - + - - + |
| $S_{15}$ | + - - + + - - + - + + - - + + - |

Figure 8
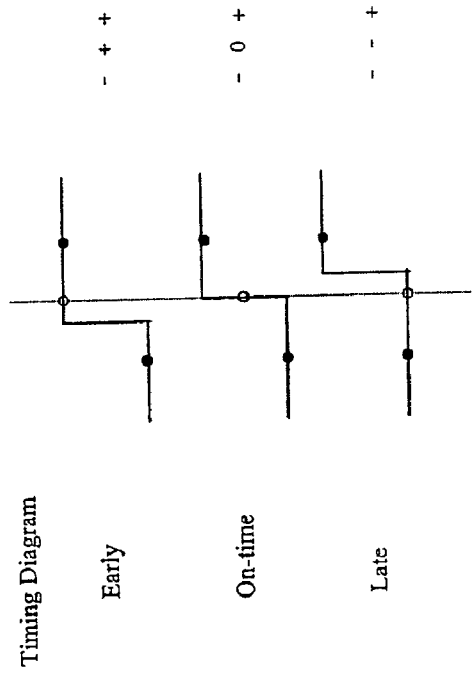
Timing Diagram
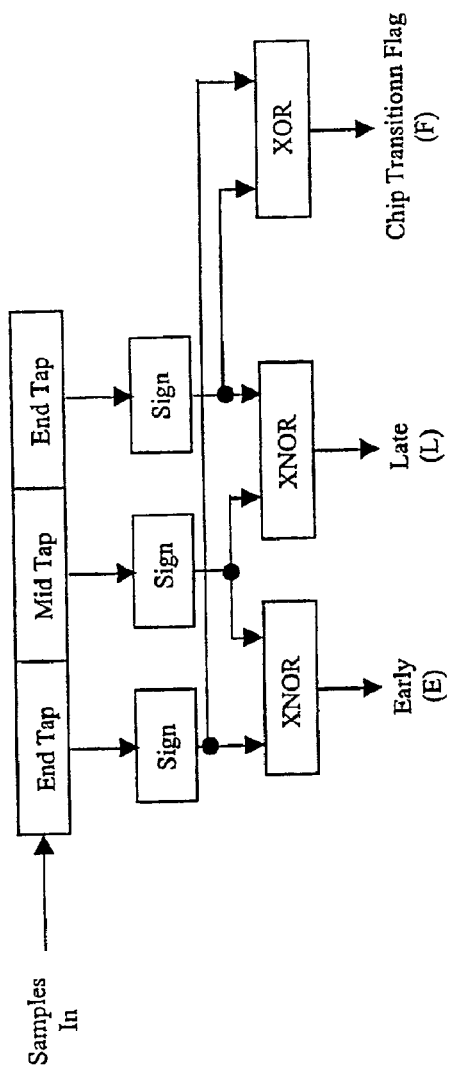
Logic Diagram

Ideal Chip Synchronisation Signal

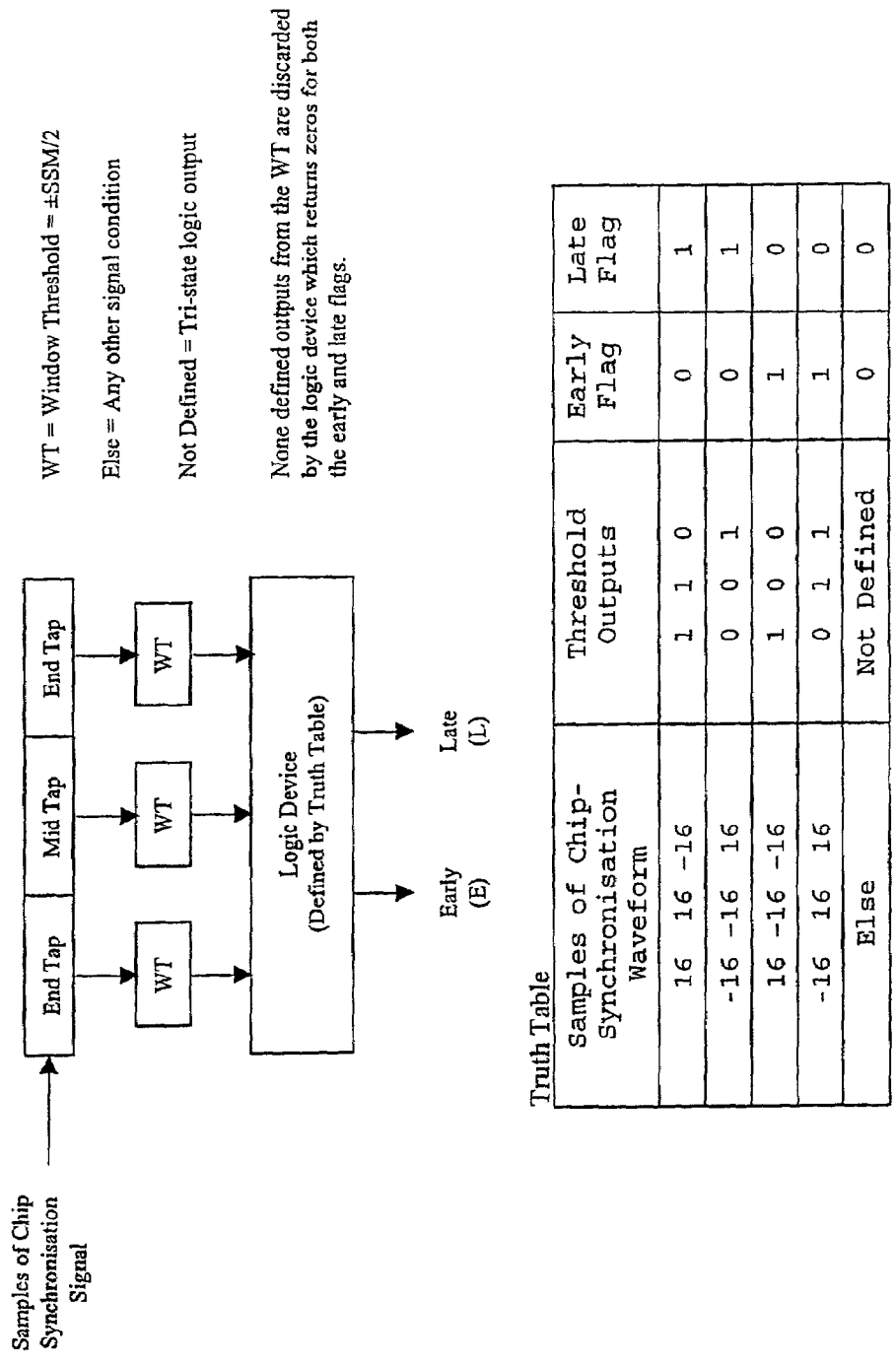

DATA COMMUNICATION IN A WIRELESS LOCAL AREA NETWORK USING M-ARY CODE KEYING

This application claims the benefit of international application number PCT/IB00/00536 filed Apr. 27, 2000. The international application was published under PCT Article 21(2) in the English language.

BACKGROUND OF THE INVENTION

The present invention relates to data communication and more particularly, to data communication using spread spectrum techniques. The invention also relates to communication applications using signature sequences.

Spread spectrum communication techniques are used for information carrying signals in a variety of communication systems because of their ability to reduce the effects of certain transmission impairments. Many multi-user communication techniques suffer co-channel interference, multiple access interference and intersymbol interference. The use of spread spectrum transmission and reception attenuates these interference types.

In Local Area Networks (LANs) there is an increasing need for wireless access. This wireless access allows mobile computer users to remain in contact with a given corporate LAN over short distances. Currently available systems provide such connections using either radio or infrared communication technology. For certain system requirements, this communication is adequate. However, the data transmission rates achievable are relatively low and this significantly limits the number of applications to which the systems may be applied and implementation costs are often prohibitive.

Wireless local area network (WLAN) products were thus for a long time a specialty, made available by a small number of vendors and built accordingly to meet proprietary requirements. The Institute of Electrical and Electronic Engineers (IEEE) in June 1997 formalized a standard that will control interoperability of such products known as 802.11. While this standard will undoubtedly promote the growth of WLAN products, the problems of transmission rates, reliability and cost remain. One possible solution is obtained by the application of spread spectrum communication techniques using signature sequences. One such approach is identified in "A 2.4 GHz 11 MBps Baseband Processor for B02.11 Applications", ANDREN; Harris Semiconductor (May 05, 1998). While implementations of this type overcome the traditional problems, it is difficult to synchronise data communication without the use of complex circuitry. Synchronisation difficulties include chip and symbol synchronisation as well as the problem of signal strength measurement.

One solution to these problems has been proposed by Harris (i.e. the Intersil PRISM radio chip set for use in the new 802.11 WLAN standard at 11 Mb/s. In common with most proposed solutions there is a phase involving the acquisition of synchronisation and a phase involving the maintenance. Acquisition in this case, is accomplished using a single correlator and an embedded Barker sequence. Synchronisation is maintained using an early-late detector. See "A 156-MB/S Interface CMOS LSI for ATM Switching Systems", KOSAKI T. et al Ieice Transactions on Communication, JP, Institute of Electronics Information and Communication Engineering, Tokyo (Jan. 06, 1993), E76-B (6), 684–693. While the previously known 'Harris type' early-late detector solution is practical in a wide variety of applications, the early-late detector operates directly on the incoming sequence stream, which is composed of binary codes at the input. This leads to reliability problems in that quality of the signal cannot be guaranteed.

There is therefore a need for a method and apparatus, which will overcome the aforementioned problems.

SUMMARY OF THE INVENTION

It is an object of this invention to provide a method and apparatus for data communication which delivers synchronisation acquisition in terms of chip symbol synchronisation and signal strength measurement (SSM).

It is a further object of the invention to provide synchronisation maintenance in terms of chip synchronisation.

Accordingly there is provided a method and apparatus for data communication in a WLAN network using M-ary Code Keying.

Preferably M-ary Code keying is used for synchronisation of data communication in the network.

Preferably the synchronisation scheme utilises Supergold Structured Codes for acquisition. These codes are described in WO99/33212.

Ideally, the synchronisation scheme also utilises Supergold Structured Codes for maintenance.

Ideally, the synchronisation scheme also utilises Supergold Structured Codes for signal strength measurement.

In one arrangement synchronisation maintenance is achieved using an early-late detector.

In a particularly preferred arrangement, synchronisation signals are derived at the output of a bank of correlators during data detection wherein the incoming sequence stream incorporates Structured Codes as mentioned above. This provides a significant improvement in reliability in synchronisation resulting from an improved signal strength on which to synchronise. This implementation allows for the codes to be used for all aspects of communication reducing circuit complexity and cost as well as component count and possibility for error during fabrication of data communication networks. Furthermore, the data communication method and apparatus are more resilient to noise as a result of implementation after correlation.

In one arrangement, the correlators a grouped as a first group, a second group, a third group and a fourth group.

Preferably, the sum of the responses of all correlators in groups to the repetitive periodic transmission of one code, is a constant.

Preferably, the difference signal defines a periodic bipolar waveform referred to as the chip-synchronisation waveform.

In one arrangement, the difference signal is obtained by the difference between the first and third group less second and fourth group.

In another arrangement, the difference signal is obtained by the difference between the second and fourth group less the first and third group.

In a preferred embodiment, the periodic bipolar chip-synchronisation waveform is a squarewave signal.

Preferably, a symbol detector circuit is used at the correlator outputs deriving substantial signal to noise ratio benefit from the processing gain advantage of spread spectrum.

Preferably, an early-late detector circuit is used at the correlator outputs deriving substantial signal to noise ratio benefit from the processing gain advantage of spread spectrum.

Ideally, the waveform used to maintain synchronisation has a period equaling twice the chip period.

Preferably, the correlator coefficients are configured such that when one sample is taken per chip with all signals and correlations taken to be in bipolar form then the sum of the responses of all correlators to the repetitive periodic transmission of one code, is a constant.

Ideally also the difference signal is a periodic bipolar waveform with a period equaling twice the chip period. Both of these properties being particularly useful for synchronisation acquisition purposes. Preferably, the difference signal is a squarewave signal.

Ideally, both the method and apparatus described above are formed for both acquisition and maintenance of synchronisation.

Ideally, a transceiver of the system is formed that implements the concept of acquire-and-maintain.

Preferably the symbol acquisition circuitry will deliver a periodic squarewave with a periodicity equaling the symbol period.

Ideally, the squarewave rising edge coincides with the symbol sample at the correlator outputs.

14. According to another aspect of the invention there is provided a method for data communication in a Wireless local area network (WLAN) using a plurality of correlators and M-ary Code Keying with an associated chip period characterised in that the communication utilises a Supergold signature sequence for simultaneously generating:—
  a periodic signal for acquiring symbol synchronisation; and
  a difference squarewave signal for acquiring and maintaining chip synchronisation.

Preferably, the utilisation of the Supergold signature sequence further generates a sum signal for determining received signal strength and setting threshold levels.

Ideally, the responses of all correlators to the repetitive periodic transmission of one code is a constant.

Preferably, the difference signal is a periodic bipolar squarewave signal.

Ideally, the periodic bipolar squarewave signal has a period of twice the chip period.

In one arrangement, the method utilizes periodic transmission means for producing a zero value sidelobe of a summed correlation.

Preferably, correlator summation is initiated in response to the periodic transmission.

Preferably, the correlator summation is directed to a thresholding circuit.

In one embodiment, the correlator summation is directed to a comparison logic for level determination.

In a particularly preferred embodiment, an early-late detector circuit is connected at the correlator outputs.

Preferably, the method incorporating means for window-thresholding a chip synchronisation waveform.

According to a further aspect of the invention there is provided a data communications apparatus for use in a Wireless local area network (WLAN) incorporating a plurality of correlators and being formed for M-ary Code Keying at an associated chip period characterised in that the apparatus is formed for communication with a Supergold signature sequence to simultaneously generate:—
  a periodic signal for acquiring symbol synchronisation; and
  a difference squarewave signal for acquiring and maintaining chip synchronisation.

Preferably, the apparatus incorporates means for generating a sum signal for determining received signal strength and setting threshold levels.

Preferably, the sum of the responses of all correlators to the repetitive periodic transmission of one code is a constant.

Ideally, the difference signal is a periodic bipolar squarewave signal.

Preferably, the periodic bipolar squarewave signal has a period of twice the chip period.

In one arrangement, the apparatus incorporates periodic transmission means for producing a zero value sidelobe of a summed correlation.

Preferably, correlator summation is initiated in response to the periodic transmission.

Preferably, the correlator summation is directed to a thresholding circuit.

In one arrangement, the correlator summation is directed to a comparison logic for level determination.

Ideally, an early-late detector circuit is connected at the correlator outputs.

Preferably, the apparatus incorporates means for window-thresholding a chip synchronisation waveform.

BRIEF DESCRIPTION OF THE DRAWINGS

The invention will now be described more particularly with reference to the accompanying drawings, which show, by way of example only, one embodiment of data communication method and apparatus according to the invention. In the drawings:

FIG. 1 shows a codebook used in the synchronisation scheme of the invention;

FIG. 8 shows a Harris type early-late detector;

FIG. 11 shows the Supergold early-late detector

DETAILED DESCRIPTION

Figure 2:
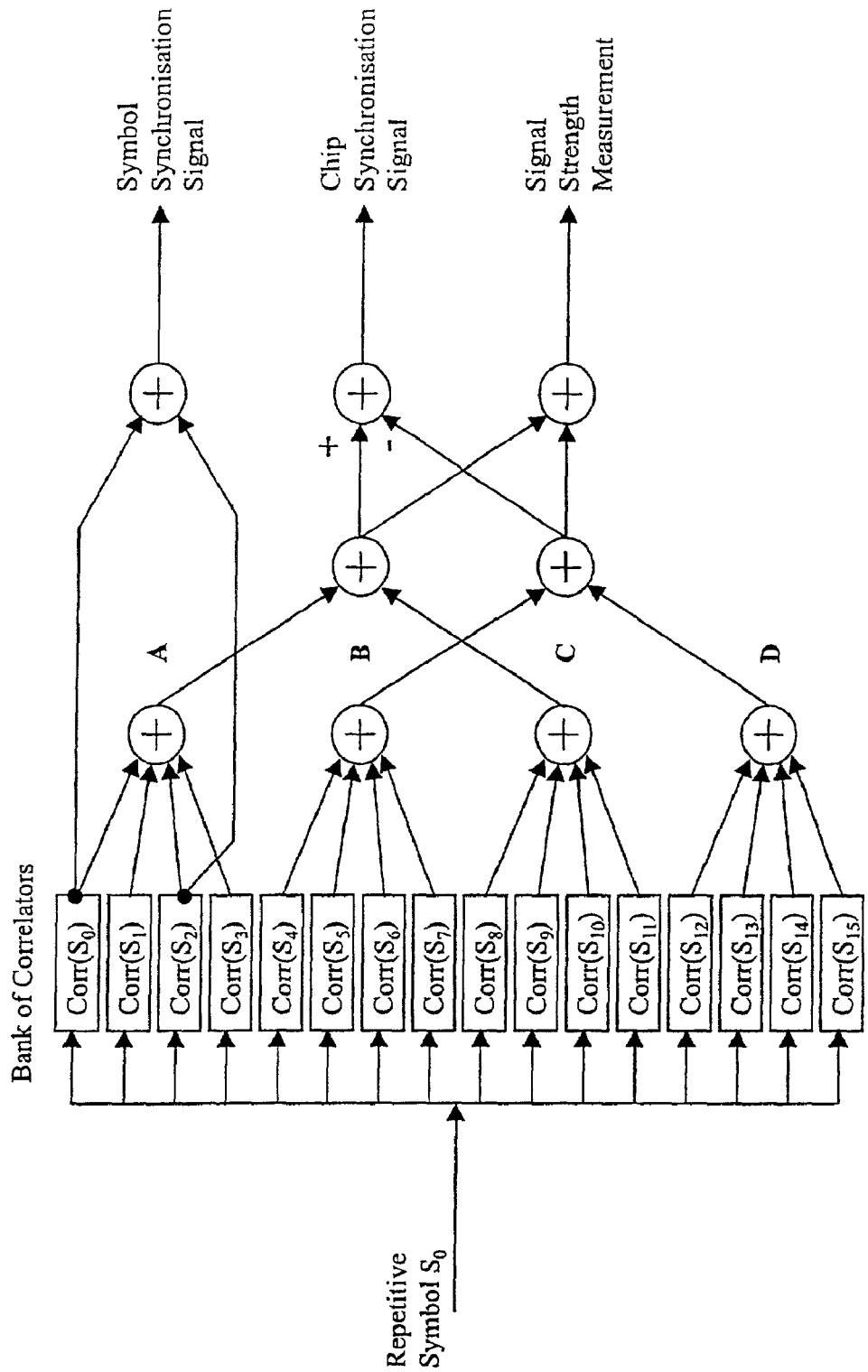
FIG. 2 shows a bank of correlators for use in the invention.

For the purposes of this specification reference will be made to the codebook of FIG. 1 used in the synchronisation method and apparatus of the invention. The codebook is used to set each of the coefficients of a bank of correlators for use in the invention shown in FIG. 2. The bank of correlators shown in FIG. 2 is used as part of the maximum likelihood detection process associated with an M-ary Code Keying scheme. In such a detection scheme an incoming symbol is correlated with each sequence in the codebook and the peak correlation value, as determined by a greatest peak detector, identifies the symbol (i.e. sequence) transmitted. The data represented by this symbol can then be recovered accordingly. The essence of this invention is that the properties of Supergold Structured Codes allow the same bank of correlators, as used in the M-ary detection of data, to be simultaneously used for the acquisition and maintenance of synchronisation.

Defining:—
  A as the sum of the responses of a first group of correlators $Corr(S_0)$ to $Corr(S_3)$;

B as the sum of the responses of a second group of correlators Corr($S_4$) to Corr($S_7$);

C as the sum of the responses of a third group of correlators Corr($S_8$) to Corr($S_{11}$); and D as the sum of the responses of a fourth group of correlators Corr($S_{12}$) to Corr($S_{15}$).

The specific properties being exploited are: (1) that the Sum(0,2) provides an ideal periodic signal from which to acquire symbol synchronisation; (2) the difference signal (A+C)–(B+D) or (B+D)–(A+C) provides an ideal square-wave signal from which to acquire and maintain chip synchronisation; and (3) the sum signal A+B+C+D provides an accurate measure of the received signal strength which can be used to set threshold levels within the synchronisation scheme. It is the unique way in which Supergold encoding provides these signals that constitute the invention within this field.

For convention, the first code, $S_0$, is selected for periodic application to the input of the bank of correlators. The individual responses of the correlators Corr($S_0$) and Corr($S_2$) to the application of symbol $S_0$ are shown below together with the Sum(0,2)=Corr($S_0$)+Corr($S_2$).

| Corr ($S_0$) | 16 | 0 | -4 | 0 | 0 | 0 | 4 | 0 | 0 | 0 | 4 | 0 | 0 | 0 | -4 | 0 |
|---|---|---|---|---|---|---|---|---|---|---|---|---|---|---|---|---|
| Corr ($S_2$) | 0 | 0 | 4 | 0 | 0 | 0 | -4 | 0 | 16 | 0 | -4 | 0 | 0 | 0 | 4 | 0 |
| Sum (0, 2) | 16 | 0 | 0 | 0 | 0 | 0 | 0 | 0 | 16 | 0 | 0 | 0 | 0 | 0 | 0 | 0 |

The sum of the response of the $0^{th}$ and $2^{nd}$ correlators, denoted by Sum(0,2) (for the purposes of this specification the convention Sum(i,j) will be used to denote the summation of the $i^{th}$ and $j^{th}$ correlator outputs), is an ideal impulse occurring at twice the symbol rate. Without loss of generality codes other than $S_0$ may be used with the correlator combinations being chosen accordingly to give the desired response.

In addition use of the codebook in setting correlator coefficients in this way ensures that, providing at least one sample is taken per chip with all signals and correlations taken to be in bipolar form that:— the sum of the responses of all correlators to the repetitive periodic transmission of one code, is a constant; and the difference signal (A+C)—(B+D) or (B+D)–(A+C) is a periodic bipolar squarewave signal with a period equaling twice the chip period.

Both of these properties being particularly useful for synchronisation acquisition purposes.

There are two elements to synchronisation in data communication, irrespective of data type, namely, the acquisition and maintenance of synchronisation.

Acquisition is carried out at the start of data transmission and its sole purpose is to acquire the incoming signal by aligning the receiver chip and symbol clocks with the incoming signal.

Maintenance techniques are used to maintain the chip and symbol clocks in line with the incoming signal during the transmission of the data.

For chip synchronisation to be possible, two samples per chip are needed, thereby doubling the sampling rate. Thus the delay line is designed to have double the length of the correlator (i.e. 32 delay taps instead of just 16). From a detection point of view, the number of taps, however, may be kept at 16, where in this case, a tap is drawn from every other position in the delay-line. The correlator design is shown in more detail in FIG. 3.

A perfect periodic impulse being obtained from the sum of the $0^{th}$ and the $2^{nd}$ correlator outputs while transmitting code $S_0$ periodically ensures that the resultant sidelobe of the summed correlation is zero because of the relationship between code $S_0$ and code $S_2$. This is also true for codes $S_4$, $S_6$, $S_8$, $S_{10}$ etc. The signal generated is called the symbol-synchronisation waveform. The symbol-synchronisation waveform contains two peaks marking the start and mid point of a symbol period. In order to remove the ambiguity between which peak marks the start and which peak marks the middle of a symbol period, the individual Corr($S_0$) and Corr($S_2$) waveforms are compared at the peak instances. At a peak instance when Corr($S_0$) exceeds Corr($S_2$) then the peak represents the start of the symbol period and when Corr($S_2$) exceeds Corr($S_0$) then the peak represents the mid point of the symbol period. The occurrence of a peak is determined by threshold detecting the symbol-synchronisation waveform with a threshold set at SSM/2 (i.e. 8 for the length 16 codes used in this example).

Figure 5:
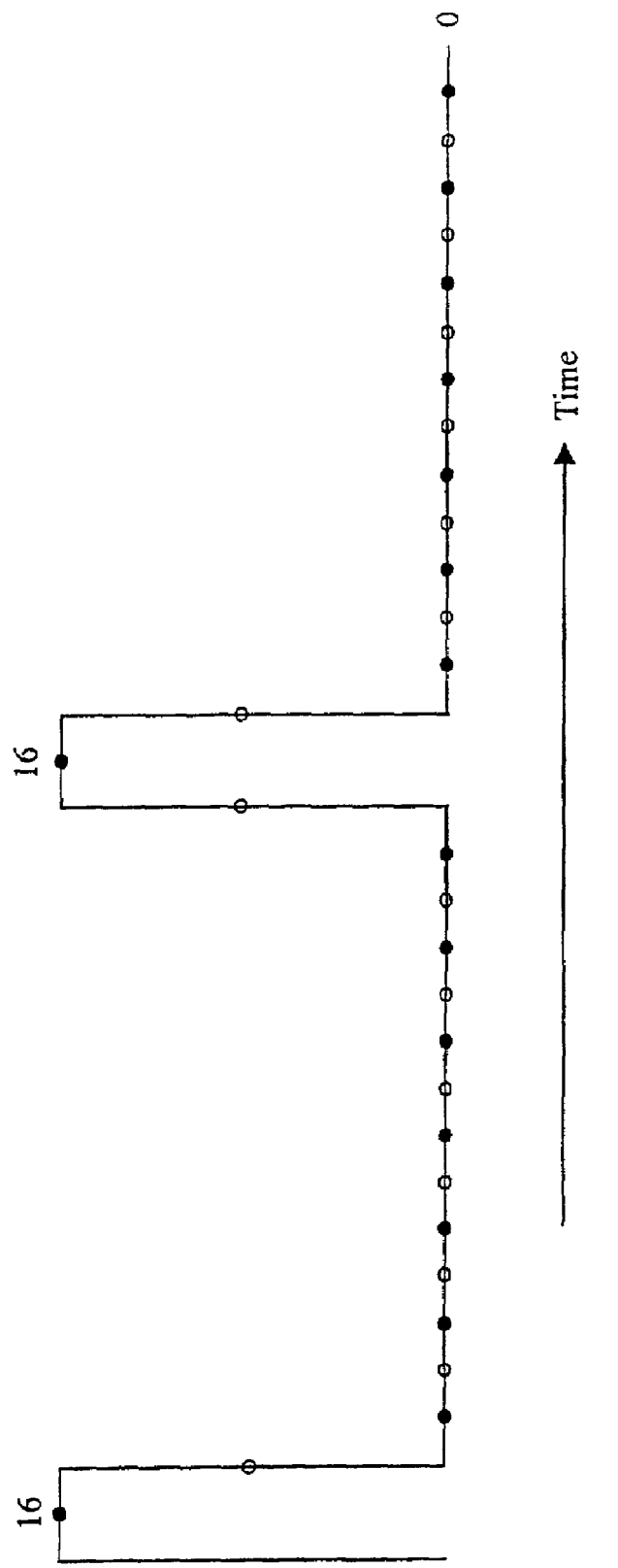
FIG. 5 shows the Sum(0,2) waveform in response to symbol $S_0$.
Figure 6:
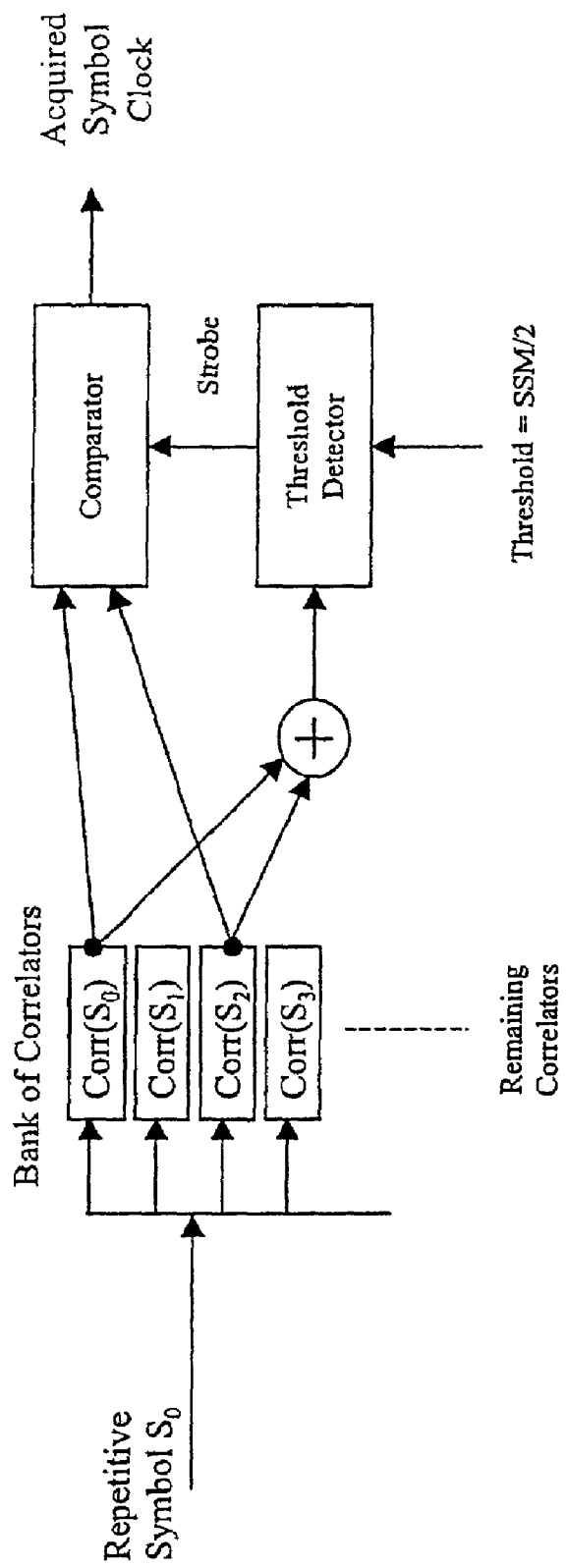
FIG. 6 shows the symbol synchronisation waveform generator.

FIG. 5 shows the summing of Corr($S_0$) and Corr($S_2$) in response to the periodic transmission of code $S_0$. FIG. 6 shows the implementation of the symbol synchronisation acquisition scheme, where it is assumed that code $S_0$ is periodically transmitted. The summation of correlators Corr ($S_0$) and Corr($S_2$) is used as an input to a thresholding circuit, which uses a pre-specified threshold of value SSM/2. The outputs of the correlators of interest are also applied to a comparison logic which, when strobed, determines if the output of Corr($S_0$) is greater than Corr($S_2$) or vise versa.

Every time Sum(0,2) crosses the threshold, a comparison is made between the output Corr($S_0$) and Corr($S_2$). If the output of Corr($S_0$) is greater than Corr($S_2$), then a symbol synchronisation is declared by driving the output of the comparison logic high. When the output of Corr($S_2$) is greater than Corr($S_0$), then the output of the comparison logic is driven low. In this way a symbol clock is generated whose rising edge corresponds to the symbol sample time when the outputs from the correlators are passed to the greatest peak detector for the purpose of data detection.

Figure 7:
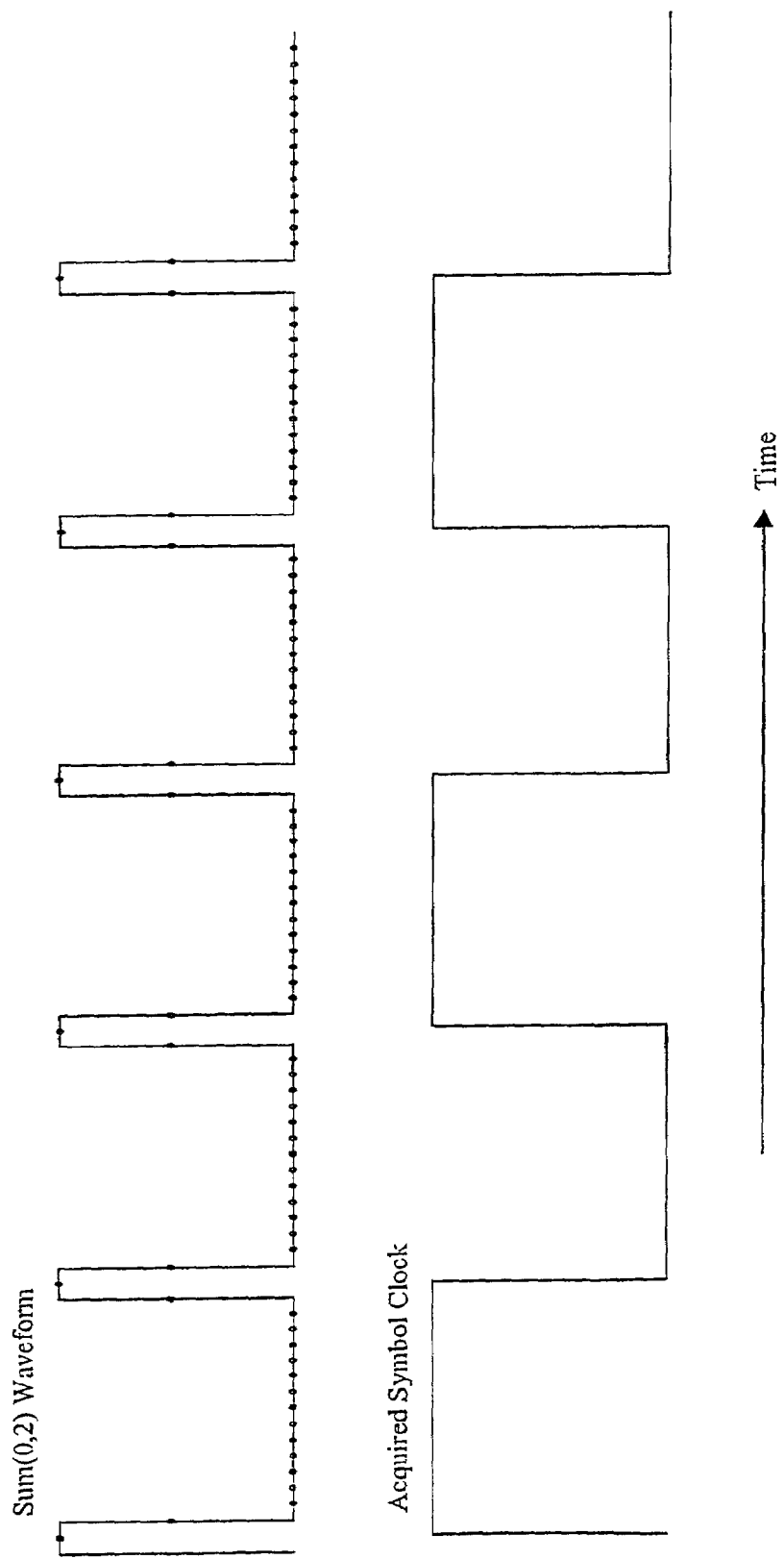
FIG. 7 shows symbol synchronisation waveforms.

The upper waveform in FIG. 7 constitutes the Sum(0,2), which is applied to the thresholding circuit. After the thresholding and comparison, the output obtained from the comparison circuitry is shown as the lower waveform in FIG. 7. It can clearly be seen that the symbol acquisition circuitry of FIG. 6 will deliver an ideal periodic squarewave with a periodicity equaling the symbol period. Moreover, the rising edge of the squarewave coincides with the symbol sample in the upper waveform.

During the acquisition phase, symbol synchronisation is usually declared with a high degree of certainty after the successful detection of several contiguous symbols. Once symbol synchronisation has been acquired then a packet based transmission scheme would normally latch the current threshold value, align the symbol clock with the symbol sample time and then rely on chip synchronisation to maintain accurate symbol synchronisation during the transmission of data.

The Harris chip set (described in brief above) takes two samples per chip. Ideally, a sample is required to be placed in the middle of one chip and is referred to as an end sample. The other sample will fall in the mid point between the end samples of the two consecutive chips, i.e. on the chip transition in the case when there is a chip transition. This sample is referred to as a mid sample. Chip synchronisation adjustment can only be made when a chip transition occurs and is detected.

When a chip transition takes place then, with two samples per chip the following sample patterns shown in FIG. 8 are possible. The two end samples shown in the figure are used for correlation, the mid and end samples are used for synchronisation purposes. The procedure is as follows:

1. Determine if a chip transition has occurred. A chip transition occurs when the two end samples have different signs. The chip transition flag is set.
2. If chip transition occurs then determine if a chip synchronisation error occurred. This is done by comparing the sign of the mid sample with the signs of the two end samples.
3. If the sign of the mid sample is the same as the LHS end sample, then sampling is slowed down (i.e. the late flag is set). Else sampling is speeded up (i.e. the early flag is set).

Note this technique will always make a synchronisation adjustment when there is a chip transition. The logic required for the Harris chip tracking is also shown in FIG. 8.

Three outputs are produced. The chip transition flag (F) indicates that chip synchronisation information is available when driven to logic '1'. When set, the early (E) and late (L) flags indicate that the receiver sampling clock is running either slow or fast, respectively.

Figure 9:
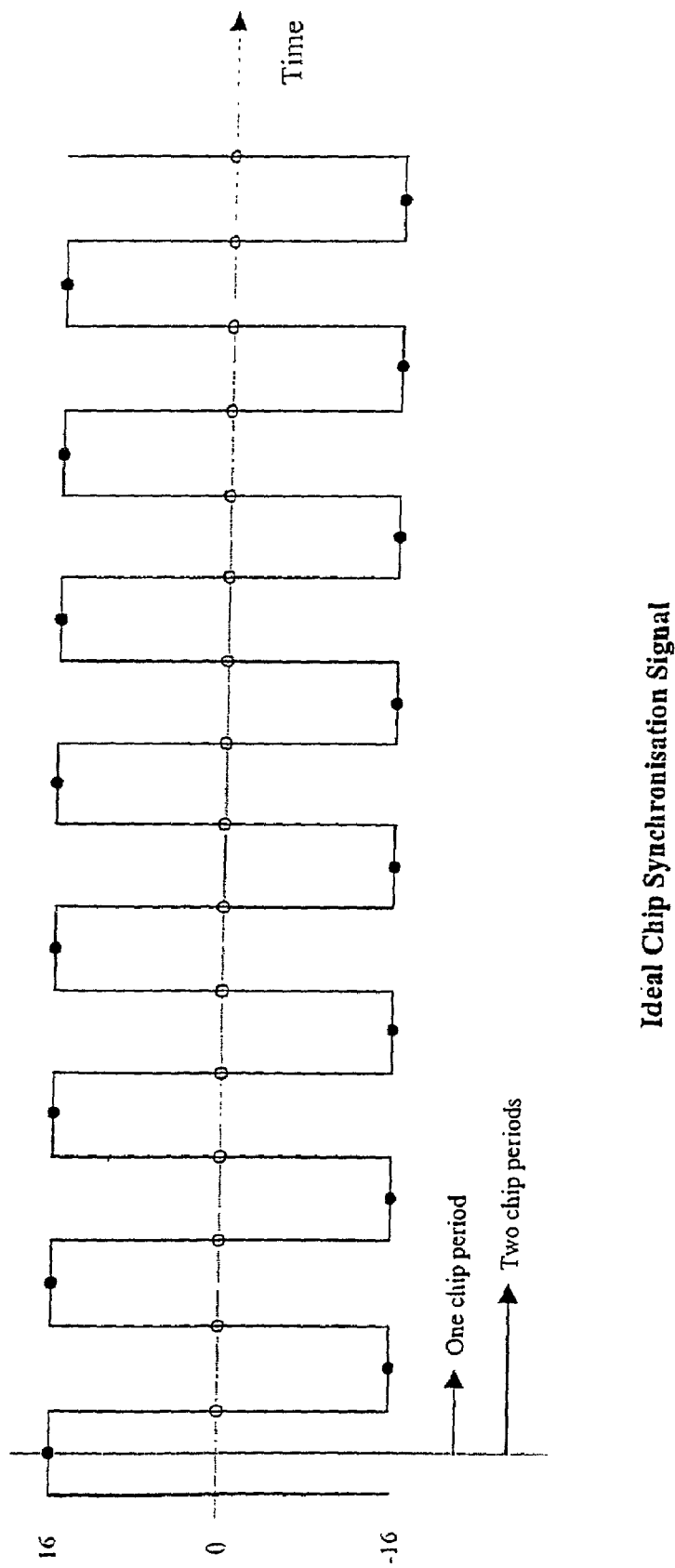
FIG. 9 shows the chip synchronisation waveform.

The difference signal (A+C)−(B+D) or (B+D)−(A+C) is a periodic squarewave signal with a period equaling twice the chip period. This is the case when the sampling is perfect, i.e. one sample lies in the middle of the chip while the other lies on a chip transition. FIG. 9 depicts this case. The advantage of this waveform is that a transition occurs every chip period and not just every chip transitions.

Figure 10:
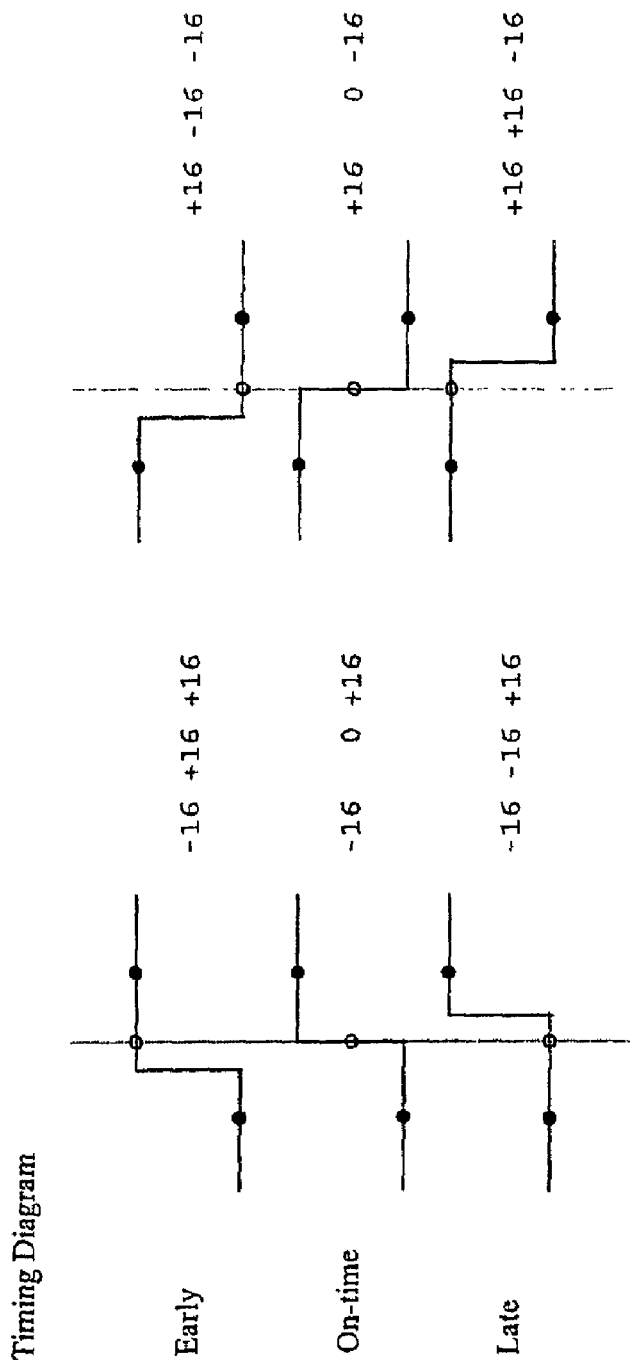
FIG. 10 shows the early-late waveform conditions for Supergold encoding.

The effect of early, perfect and late signalling on the resultant periodic squarewave signal is given in FIG. 10. While sampling is perfect, samples fall at the maximum (+16) and the minimum (−16), whilst other samples fall exactly at the middle point between the two waveform extremes indicating that a circuit based on the Harris type early-late detector can be used, this circuit is used at the correlator outputs and therefore, derives substantial signal to noise ratio benefit associated with the processing gain advantage of spread spectrum.

FIG. 11 shows a modified version of the Harris type early-late detector of FIG. 8. The modification is required because it is necessary to window-threshold the chip synchronisation waveform which is no longer binary in general for the arbitrary transmission of symbols.

The modified early-late detector must operate correctly during the phase when the preamble is being transmitted and during the phase when data is being transmitted. During the former the symbol $S_0$ is transmitted giving the ideal chip-synchronisation waveform shown in FIG. 9. For this case a single threshold value of zero may be applied to the chip-synchronisation waveform in order to detect the early and late condition. However, when random data is transmitted the chip synchronisation waveform is no longer an ideal squarewave but instead consists of a number of intermediate discrete values between ±8 (i.e. between ±SSM12). By applying a window-threshold of 18 (i.e. ±SSM/2) to the chip-synchronisation signal produces an unambiguous early-late signal. Though the frequency of occurrence of the early-late signal is reduced compared to the preamble phase, it occurs frequently enough to maintain chip synchronisation.

The operation of the modified early-late detector illustrated in FIG. 11 may be explained by the following truth table.

| Samples of Chip-Synchronisation Waveform | | | Threshold Outputs | | | Early Flag | Late Flag |
|---|---|---|---|---|---|---|---|
| 16 | 16 | −16 | 1 | 1 | 0 | 0 | 1 |
| −16 | −16 | 16 | 0 | 0 | 1 | 0 | 1 |
| 16 | −16 | −16 | 1 | 0 | 0 | 1 | 0 |
| −16 | 16 | 16 | 0 | 1 | 1 | 1 | 0 |
| Else | | | Not Defined | | | 0 | 0 |

In the above table Else refers to any other condition including the perfect synchronisation conditions {16, 0, −16} and {−16, 0, 16}.

Three samples of the chip-synchronisation waveform are loaded into the 3 tap delay line and the contents of each tap is threshold detected against the window threshold ±T, where T=SSM/2=8 for the example given. The binary outputs from the window-threshold detector are fed to the logic device which applies the truth table shown above in order to determine early-late signals. Early-late signals are only produced for the threshold output combinations given in the truth table. Any other combination of threshold outputs including the perfect synchronisation condition as well as exception conditions return no early-late flags indicating that no adjustment of the receiver's clock needs to be made. For the notation adopted, when a late flag is received the receiver clock should be slowed down and when an early flag is received then the receiver clock should be speeded up. In this way chip synchronisation is maintained at the receiver. The 3 tap delay line is updated every chip period in order to ensure that the mid sample is always located in the centre tap while the two end samples are located in the first and third taps.

In the above description the notation adopted to denote early-late detection is based on the premise that the transmitter clock is fluctuating with respect to the receiver clock. Therefore, when the transmitter clock transition is late then the late flag goes high indicating that the receiver clock should be slowed down. Conversely, when the transmitter clock transition is early then the early flag goes high indicating that the receiver clock should be speeded up.

It is important to note that the Harris type early-late detector illustrated in FIG. 8 derives its chip synchronisation signal directly from the received input symbol prior to correlation, that is to say at chip level. For this reason, such detectors specify that a positive signal-to-noise ratio is required within the chip bandwidth limiting the proposed solution. In contrast, the technique of the invention is implemented after correlation and does not require this restriction on the SNR ratio in the chip bandwidth, and thus has a broader dynamic SNR range of operation.

During the symbol synchronisation acquisition phase, the sum of the responses of all the correlators (see above) was indicated as being constant at SSM=+16. This constant value constitutes an instantaneous measure of the received signal strength and can be used to derive any signal-strength dependent threshold that is used in the receiver, e.g. the threshold required by both symbol and chip synchronisation procedures.

Figure 3:
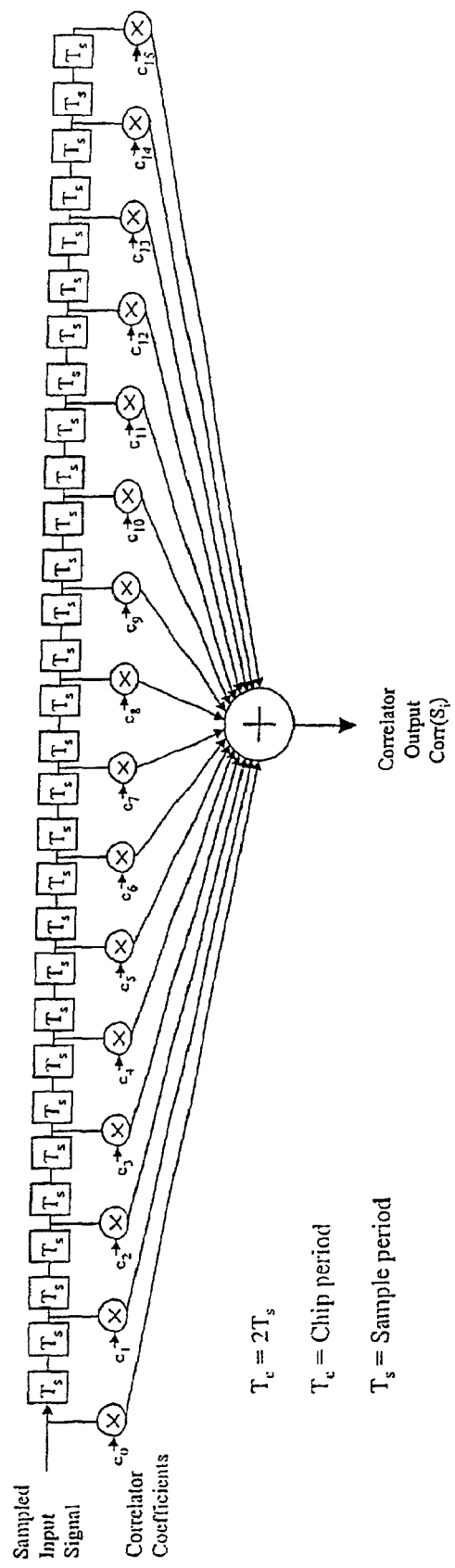
FIG. 3 shows a tapped delay line correlator.
Figure 4:
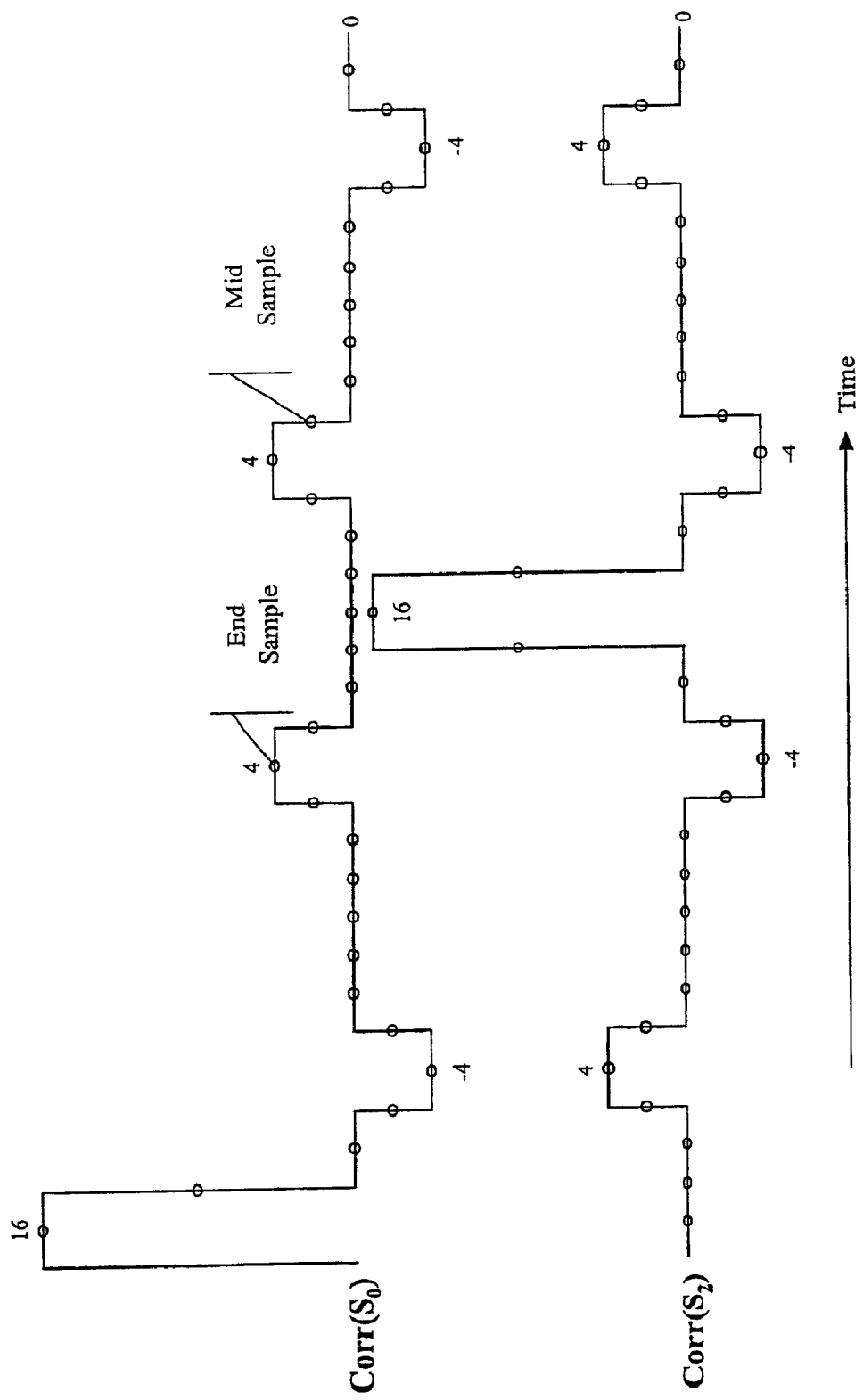
FIG. 4 shows $Corr(S_0)$ and $Corr(S_2)$ output waveforms in response to symbol $S_0$.

This signal strength measurement continues to give the required results when the two samples per chip are taken with the correlators as shown in FIG. 3. Furthermore, it is also valid under all perfect and imperfect chip synchronisation conditions. However due to the presence of additive noise, it is recommended to average the instantaneous SSM over a number of symbols. This is done during the symbol synchronisation acquisition phase. Once symbol synchronisation is acquired the SSM, and hence the threshold values, can be latched for the duration of the data detection phase. This procedure assumes that there is no change in the signal strength during the transmission of a packet of data.

Once the acquisition phase is completed, the receiver then switches to data receiving mode. During this phase, the receiver must remain in synchronisation in order for optimum data detection to be possible.

The exact symbol sampling instance having been determined from the symbol acquisition phase of the transmission, is used to synchronise the receiver symbol clock. The receiver symbol clock is typically a free running clock with a cycle time of 32 samples. After counting 32 samples the positive edge of this clock is used to latch correlator outputs into the data decision circuit and hence produce received estimates of the transmitted data. When symbol synchronisation is declared the symbol clock is reset. Then one complete symbol can be assumed to be resident in the bank of correlators whenever the counter reaches a count of 32 samples. By maintaining chip synchronisation, the periodicity of the symbol clock remains sufficiently accurate for the correct detection of data.

It will be understood that the current invention relates both to the specific architectures described as embodiments of the underlying invention namely the use of communication codes for synchronisation. This use has the technical effect of reducing component count, complexity and cost. Additionally the manner of use of the signal downstream of the correlators to improve signal quality and therefore system robustness is also an important feature of the invention. Both of the above being read in conjunction with benefits of using Supergold Structured Codes for this purpose.

It will of course be understood that the present invention is not limited to the specific details described herein, which are given by way of example only and that various modifications and alterations are possible within the scope of the invention as defined by the appended claims.

What is claimed is:

1. A method for data communication in a Wireless local area network (WLAN) using a plurality of correlators and M-ary Code Keying with an associated chip period, wherein the communication utilizes a signature sequence of a type generated by performing the steps of:
    selecting a seed set of sequences of a given size having a plurality of inner sequences;
    generating a plurality of cosets from the seed set of sequences by multiplying in turn each inner sequence by an element of an associated sequence;
    constructing a subset of sequences by concatenating the sequences of a coset; and
    constructing a full set of sequences by concatenating subsets of sequences, for simultaneously generating:
        a periodic signal for acquiring symbol synchronization; and
        a difference squarewave signal for acquiring and maintaining chip synchronization, a chip synchronization signal being generated by subtracting a sum of even groups of correlator outputs from a sum of odd groups of correlator outputs.

2. A method as claimed in claim 1 in which the utilization of the signature sequence further generates a sum signal for determining received signal strength and setting threshold levels.

3. A method as claimed in claim 1 in which the sum of the responses of all correlators to the repetitive periodic transmission of one code is a constant.

4. A method as claimed in claim 1 in which the difference signal is a periodic bipolar squarewave signal.

5. A method as claimed in claim 4 in which the periodic bipolar squarewave signal has a period of twice the chip period.

6. A method as claimed in claim 1 including the step of generating a periodic transmission for producing a zero value sidelobe of a summed correlation.

7. A method as claimed in claim 6 in which summation of the correlators is initiated in response to the periodic transmission.

8. A method as claimed in claim 7 in which the correlator summation is directed to a thresholding circuit.

9. A method as claimed in claim 7 in which the correlator summation is directed to a comparison logic for level determination.

10. A method as claimed in claim 1 in which an early-late detector circuit is connected at the correlator outputs.

11. A method as claimed in claim 10 incorporating means for window-thresholding a chip synchronization waveform.

12. A data communications apparatus for use in a Wireless local area network (WLAN) incorporating a plurality of correlators and being formed for M-ary Code Keying at an associated chip period, wherein the apparatus is formed for communication with a signature sequence of a type generated by:
    means for selecting a seed set of sequences of a given size having a plurality of inner sequences;
    means for generating a plurality of cosets from the seed set of sequences by multiplying in turn each inner sequence by an element of an associated sequence;
    means for constructing a subset of sequences by concatenating the sequences of a coset;
    means for constructing a full set of sequences by concatenating subsets of sequences;
    means for generating a period signal for acquiring symbol synchronization; and
    means for generating a difference squarewave signal for acquiring and maintaining chip synchronization and for generating a chip synchronization signal by subtracting a sum of even groups of correlator outputs from a sum of odd groups of correlator outputs.

13. An apparatus as claimed in claim 12 incorporating means for generating a sum signal for determining received signal strength and setting threshold levels.

14. An apparatus as claimed in claim 12 in which the sum of the responses of all correlators to the repetitive periodic transmission of one code is a constant.

15. An apparatus as claimed in claim 12 in which the difference signal is a periodic bipolar squarewave signal.

16. An apparatus as claimed in claim 15 in which the periodic bipolar squarewave signal has a period of twice the chip period.

17. An apparatus as claimed in claim 12 incorporating periodic transmission means for producing a zero value sidelobe of a summed correlation.

18. An apparatus as claimed in claim 17 in which summation of the correlators is initiated in response to the periodic transmission.

19. An apparatus as claimed in claim 18 in which the correlator summation is directed to a thresholding circuit.

20. An apparatus as claimed in claim 18 in which the correlator summation is directed to a comparison logic for level determination.

21. An apparatus as claimed in claim 12 in which an early-late detector circuit is connected at the correlator outputs.

22. An apparatus as claimed in claim 21 incorporating means for window-thresholding a chip synchronization waveform.

* * * * *